(12) United States Patent
Barnes

(10) Patent No.: US 8,757,629 B2
(45) Date of Patent: Jun. 24, 2014

(54) THERMAL SEAL AND METHODS THEREFOR

(75) Inventor: Vaughn V. Barnes, Corona Del Mar, CA (US)

(73) Assignee: Thermal Structures, Inc., Corona, CA (US)

(*) Notice: Subject to any disclaimer, the term of this patent is extended or adjusted under 35 U.S.C. 154(b) by 397 days.

(21) Appl. No.: 12/990,035

(22) PCT Filed: Apr. 29, 2009

(86) PCT No.: PCT/US2009/042098
§ 371 (c)(1),
(2), (4) Date: Dec. 10, 2010

(87) PCT Pub. No.: WO2009/134874
PCT Pub. Date: Nov. 5, 2009

(65) Prior Publication Data
US 2011/0074118 A1  Mar. 31, 2011

Related U.S. Application Data

(60) Provisional application No. 61/048,824, filed on Apr. 29, 2008.

(51) Int. Cl.
*F16J 15/16*  (2006.01)

(52) U.S. Cl.
USPC .................. 277/314; 277/605; 277/645

(58) Field of Classification Search
USPC .............. 277/312, 314, 605, 644, 645, 650
See application file for complete search history.

(56) References Cited

U.S. PATENT DOCUMENTS

| | | | |
|---|---|---|---|
| 2,686,747 A | | 8/1954 | Wurtz et al. |
| 2,924,471 A | | 2/1960 | Poltorak et al. |
| 3,125,346 A | * | 3/1964 | Poltorak ............... 277/311 |
| 4,194,749 A | * | 3/1980 | Bonafous .............. 251/306 |
| 4,441,726 A | | 4/1984 | Uhl |
| 4,811,529 A | * | 3/1989 | Harris et al. ........... 52/396.01 |
| 4,819,565 A | * | 4/1989 | Bechu ................... 105/11 |
| 5,047,997 A | * | 9/1991 | Forsberg ............... 367/191 |
| 5,193,823 A | * | 3/1993 | Janich .................. 277/345 |
| 5,251,917 A | * | 10/1993 | Chee et al. ............ 277/645 |
| 5,765,332 A | | 6/1998 | Landin |
| 2002/0100517 A1 | | 8/2002 | Somerville |
| 2002/0151776 A1 | * | 10/2002 | Shawgo et al. ........ 600/345 |
| 2004/0112939 A1 | * | 6/2004 | Nagao et al. .......... 228/102 |

* cited by examiner

*Primary Examiner* — Gilbert Lee
(74) *Attorney, Agent, or Firm* — Fish &Tsang LLP

(57) ABSTRACT

A thermal bulb seal has a bulb portion and a tab portion that is configured to allow welding or other attachment of the bulb seal to the end surface of an insulating structure. Most preferably, the tab portion comprises an angled portion so allow welding of the bulb seal to another insulating structure.

15 Claims, 2 Drawing Sheets

THERMAL SEAL AND METHODS THEREFOR

This application claims priority to our U.S. provisional application with the Ser. No. 61/048,824, filed Apr. 29, 2008, and which is incorporated by reference herein.

FIELD OF THE INVENTION

The field of the invention is thermal seals, and especially thermal seals at the juncture of a sealing blanket with another structure.

BACKGROUND OF THE INVENTION

Most insulation materials provide relatively homogeneous insulation characteristics over a large length or area of the material. However, and especially where the insulation material is flexible, gaps of varying width between two or more sides of adjacent insulation elements often occur during installation and considerable loss of insulation will occur.

While such gaps between insulation elements can be eliminated by allowing for overlap of the elements during installation, such method is not always desirable. For example, where the overlap is relatively large, the overhanging end may consume too much space. On the other hand, where the overlap is relatively small, the overlap is often sewn or otherwise fixed to the remaining insulation material that tends to increase time for installation. Moreover, where the overlap is fixed to the remaining insulation material, thermal expansion of the elements may be restrained.

In still other known manners, the gap may be filled with a second insulating material to block heat escaping through the gap. Such approach is conceptually simple and often effective. However, gap filling typically requires an additional installation step and tends to create a weak spot due to the difference in material property and/or configuration.

Therefore, while various manners of coupling insulating materials are known in the art, there is still a need for improved thermal seals and methods therefor.

SUMMARY OF THE INVENTION

The present invention is drawn to configurations and methods of sealing a gap that is formed between the ends of two insulating structures, wherein a bulb seal is used to sealingly and deformably occupy the gap, and wherein the so occupied space blocks thermal leakage through the gap.

In one preferred aspect of the inventive subject matter, a method of reducing thermal leakage through a gap defined by a first end surface of a first insulating structure and a second end surface of a second insulating structure includes a step of coupling a bulb seal having a tab portion and a bulb portion to the first end surface such that a first part of the tab portion and part of the bulb portion sealingly abut with the first end surface. In another step, the second insulating structure is coupled to the first insulating structure such that first and second end surfaces oppose each other and such that the bulb portion is disposed in the gap and sealingly contacts the second end surface.

Most typically, the insulating structures are a manually deformable thermal insulation blankets or preformed insulation structures (e.g., half pipes), and most preferably have at least a metallic surface or are manufactured from a metal. It is further generally preferred that at least one of the end surfaces will have a generally flat surface. Similarly, it is generally preferred that the tab portion and/or the bulb portion are formed from a metal or comprise a metallic surface, and/or that the bulb portion is filled with a metallic or vitreous material. While not limiting to the inventive subject matter, it is also contemplated that the tab portion and the bulb portion are coupled to each other via stitching or welding. Moreover, it is generally preferred that the step of coupling the bulb seal to the first end surface is performed by welding to so, for example, form at least part of a fire barrier or other thermal barrier.

Where desirable, the tab portion may include a second part that is angled relative to the first part of the tab portion. In such case, it is typically preferred that the second part of the tab portion is angled such that the second part of the tab portion is substantially parallel with a non-end surface of the second insulating structure.

Consequently, and viewed from a different perspective, the inventor contemplates a thermal insulation device that includes a first insulating structure having a first end surface, and a second insulating structure having a second end surface, wherein the first and second insulating structures are positioned relative to each other such that a gap is defined by the first and second end surfaces. Contemplated devices will further include a bulb seal having a tab portion and a bulb portion, wherein the bulb seal is coupled to the first end surface such that a first part of the tab portion and part of the bulb portion sealingly abut with the first end surface, and wherein the second insulating structure is coupled to the first insulating structure such that the bulb portion is disposed in the gap and sealingly contacts the second end surface.

In typical embodiments it is contemplated that at least one of the first and second insulating structures is a manually deformable insulation blanket, a flat preformed insulation structure, or a curved preformed insulation structure, and that the first end surface and the first tab portion have a metallic surface and are welded together. Contemplated devices may also advantageously be configured such that the tab portion has a second part that is angled such that the second part of the tab portion is substantially parallel with a non-end surface of the second insulating structure.

In yet another aspect of the inventive subject matter, a bulb seal is contemplated that includes a tab portion and a bulb portion (which is preferably filled with a metallic or vitreous material), wherein a first part of the tab portion and the bulb portion are configured to allow formation of a sealing engagement with a first end surface of a first insulating structure by a welding process, and wherein the tab portion optionally comprises a second part that is angled to the first part.

Most preferably, at least one of the tab portion and the bulb portion is formed from a metal, and/or it is further contemplated that the tab portion and the bulb portion are coupled to each other via stitching or welding. Moreover, it is generally preferred that the second part of the tab portion is angled such that the second part of the tab portion is substantially parallel with a non-end surface of the second insulating structure.

Various objects, features, aspects and advantages of the present invention will become more apparent from the following detailed description of preferred embodiments of the invention and the accompanying drawing.

DETAILED DESCRIPTION

Figure 1:
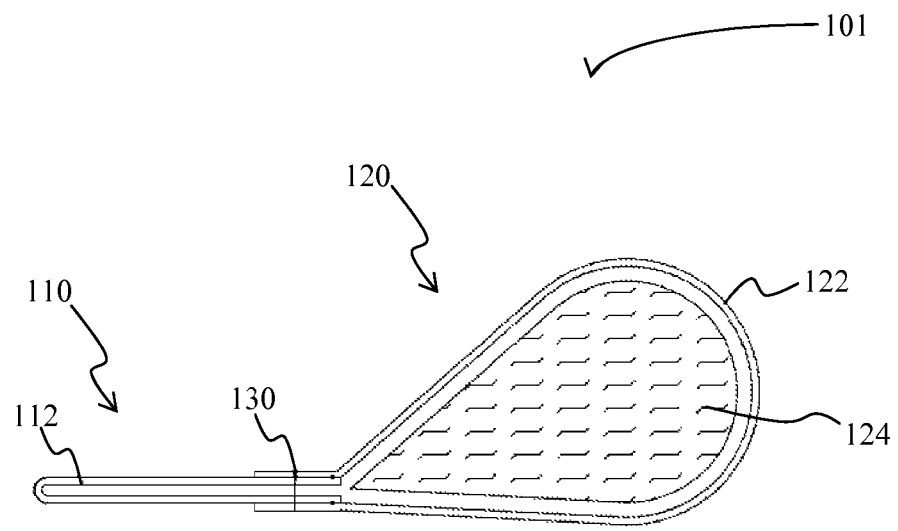
FIG. 1 depicts an exemplary thermal seal according to the inventive subject matter.

The inventor has discovered that thermal leakage through a gap that is defined by the end surfaces of two adjacent insulating structures can be reduced, or even entirely eliminated where a bulb seal is coupled to one of the end surfaces with a tab portion and wherein a bulb portion of the bulb seal is deformably and sealingly pressed against the other end surface. In especially preferred aspects of the inventive subject matter, at least the tab portion of the bulb seal is welded to the end surface of one insulating structure, which substantially reduces the time needed to provide a reliable thermal seal.

As used herein, the term "thermal leakage through a gap" refers to movement of heat or cold through a gap wherein the heat is typically emitted from a hot structure (e.g., conduit or container with medium having a temperature higher than ambient temperature [typically above 20° C.]) and/or fire or other combustion process, and wherein the cold is typically emitted from a cold structure (e.g., conduit or container with medium having a temperature lower than ambient temperature [typically below 20° C.]). As also used herein, the term "end surface of an insulating structure" refers to the surface of the insulating structure in which one dimension (typically height) is about the same (+/−15%) as the average thickness of the insulating structure, and in which the other dimension (typically length) is about the same as the length or the width of the insulating structure. Viewed from a different perspective, the term "end surface of an insulating structure" refers to a surface that connects the upper and lower surfaces of the insulating structure. Consequently, the end surface of an insulating structure will have the smallest surface area in the insulating structure.

As further used herein, the term "sealingly abut" in conjunction with the positional relationship of a first and second element means that first and second elements are positioned relative to each other to substantially completely prevent thermal leakage through the interface between the first and second elements (e.g., less than 90%, and more typically less than 95% of heat energy travels through that gap). Similarly, the term "sealingly contact" in conjunction with the positional relationship of the bulb portion and an end surface means that the bulb portion and the end surface are positioned relative to each other to substantially completely prevent thermal leakage through the interface between the bulb portion and the end surface (e.g., less than 90%, and more typically less than 95% of heat energy travels through that gap). As also used herein, the term "substantially parallel" refers to an angular difference between two elements (typically planes) of less than 30 degree, more typically less than 20 degree, and most typically less than 10 degree.

As still further used herein, the term "permanently coupling" means the elements that are coupled together remain in the same coupled relationship throughout the term of intended use. Therefore, elements that are permanently coupled to each other may still be separable, or may be separated upon reconfiguration and/or repair (which is not within the scope of the meaning of intended use). For example, a door panel and a door frame are not permanently coupled to each other as they do not remain in the same coupled relationship. On the other hand, where the only change in coupled relationship is relative movement due to thermal expansion of one or more elements, the elements will be considered permanently coupled to each other.

One especially preferred example is depicted in FIG. 1 in which a pliable bulb seal 101 is formed from tab portion 110 that is coupled to a bulb portion 120. Most preferably, both the tab portion and the bulb portion are made from a thermally resistant material 112 and 122, respectively, (e.g., fiberglass cloth or metallic foil), and the bulb portion 120 is further filled with insulating material 124 (e.g., fiberglass, ceramic, etc.). The tab portion 110 is preferably sewn (here, via stitching 130) or otherwise coupled to the bulb portion 120 to complete a pliable (typically manually deformable) seal.

While the exemplary bulb seal of FIG. 1 is drawn with certain proportions, it should be appreciated that numerous modifications are also contemplated. For example, and with further reference to the cross sectional view of the bulb seal in FIG. 1, the tab portion may extend significantly further to the left to have a width that is up to 2-fold, up to 5-fold, and even up to 10-fold (or even more) that the width of the bulb portion. Similarly, the bulb portion may extend significantly further to the right to have a width that is up to 2-fold, up to 5-fold, and even up to 10-fold (or even more) that the width of the tab portion. Moreover, it should be noted that additional (e.g., second, third, fourth, etc.) tab portions may be provided to the bulb portion, wherein the additional tab portions may extend into the same direction or in opposite directions. Likewise, where desirable, one or more bulb portions may be coupled to the tab portion(s), especially where the end surface is relatively large. Therefore, it should be recognized that the bulb seal may include multiple bulb portions that are most preferably formed from a single sheet. In such alternative structures, the bulb portions are preferably sequentially arranged, but may (alternatively, or additionally) also be stacked. Thus, seals are also contemplated in which at least one of the bulbs is filled with a different insulating material that the remaining bulbs (e.g., to accommodate to different heat exposure).

Suitable materials for the tab and bulb portions generally include all materials that are chemically and structurally stable at the temperature of intended or anticipated use. Thus, the materials contemplated herein include numerous synthetic polymers, mineral wool, various vitreous products (e.g., glass fiber, glass wool, etc.), thermally expanded graphite, refractory composite materials, and most preferably various metals and metal alloys (e.g., aluminum or stainless steel). Consequently, it should be appreciated that contemplated bulb seals and methods can be implemented with numerous and different materials other than metal foil or fiberglass cloth. For example various ceramics, silicone, and certain silicone containing polymers may be a suitable thermally insulating (and in some cases even structural) material. However, contemplated seals in especially preferred aspects will be coupled to various rigid (can not be deformed using manual force), semi-rigid (can be deformed using manual force), and flexible (can be deformed using manual force and can change configuration under gravity) metal foil encapsulated insulation products. For example, preferred semi-rigid and rigid metal encapsulated insulation products may comprise 2 to 10 mil stainless steel corrugated plates that are pressed into a desired geometry and then welded together (typically with added insulating materials in the so formed cavity).

In further preferred aspects, it is contemplated that the bulb seal is configured as a pliable bulb seal that can be manually deformed. Consequently, it should be noted that the materials and configurations used in the manufacture of the bulb portion and the tab portion may be different. For example, the tab portion may be fabricated from an aluminum strip and have cutouts, perforations, or other elements that afford flexibility of the tab portion, while the bulb portion may be fabricated from a woven fiberglass or carbon fabric that may be further filled with a fire resistant material (e.g., mineral wool). Of course, it should be noted that not only the bulb portion, but also the tab portion may be at least partially filled with a thermally insulating material.

Figure 2A:
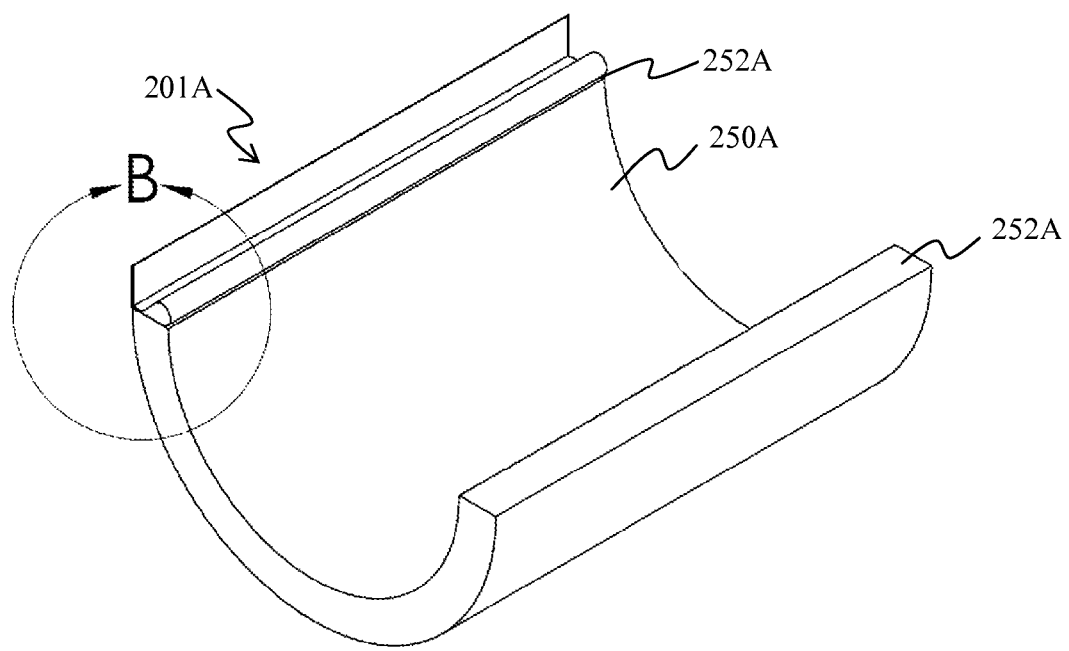
FIG. 2A depicts the thermal seal of FIG. 1 coupled to the juncture surface of an insulating material.

FIG. 2A depicts an exemplary use of pliable bulb seal 201A where the bulb seal is coupled to a half-pipe shaped thermal insulation blanket 250A along one of the end surfaces 252A of the blanket where otherwise a gap would occur when a second insulation blanket (not shown) is installed. In especially preferred aspects, the bulb seal is welded to the end surface of the insulation blanket such that the bulb seal sealably contacts the end surface. As the bulb portion (typically filled with insulating material) is pliable, the bulb sealably contacts the end surface of the second insulation blanket. Thus, it should be appreciated that the bulb seals according to the inventive subject matter can advantageously sealingly couple two adjoining blankets or other insulating structures, thus plugging a gap even where the gap has variable dimensions, which greatly reduces thermal leakage through that gap.

Figure 2B:
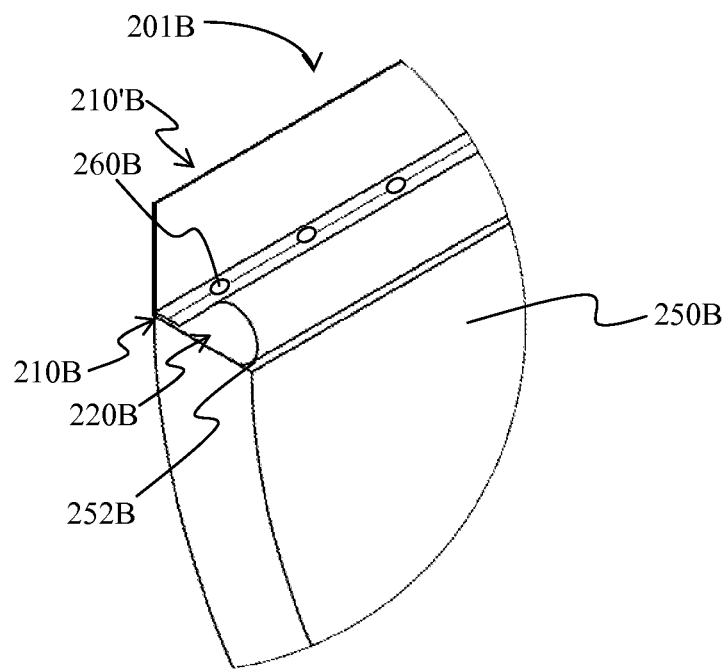
FIG. 2B depicts a detail view of FIG. 2A.

FIG. 2B depicts a detail view of exemplary blanket of FIG. 2A. Here, bulb seal 201B is welded to the end surface 252B of the half-pipe shaped thermal insulation blanket 250B using spot welds 260B. As can be readily taken from FIG. 2B, a portion of the bulb portion 220B and a portion of the tab portion 210B are in sealing contact with the end surface 252B, while another portion 210'B of the tab portion forms an angle (here: right angle) with tab portion 210B. It should be particularly appreciated that the angled portion of the tab portion will not only serve as a mechanical guide during installation, but will also provide a further shield against thermal leakage. In such case, it should be noted that some or all of the angled tab portion may be welded or otherwise affixed (e.g., via adhesive) to a non-end surface of another insulating blanket or other structure. Alternatively, where the angled tab portion is not welded or otherwise affixed, it should be appreciated that thermal expansion can be accommodated by the tab while continuously providing an additional thermal barrier.

Figure 3:
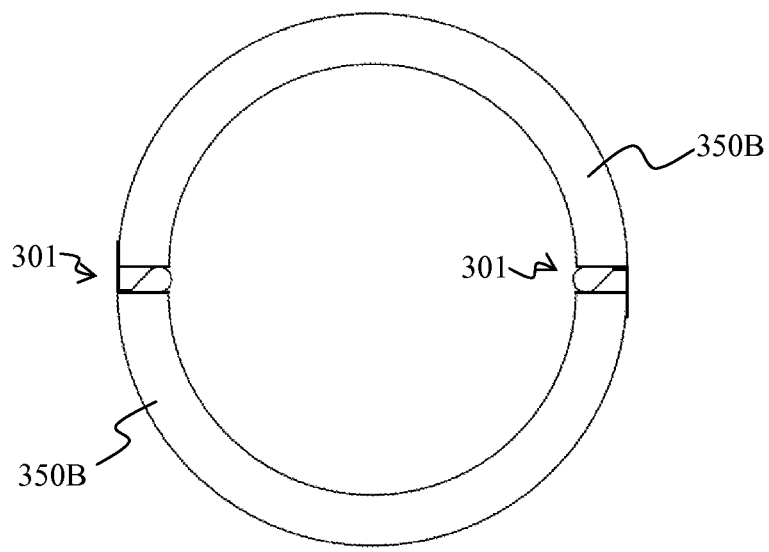
FIG. 3 depicts an exemplary insulating structure using the thermal seal of FIG. 1.

In further contemplated aspects, it should be noted that the bulb seal can be coupled to the end surface in numerous manners other than spot welding, and the most suitable manner will at least to some degree depend on the particular material used. For example, where the insulating structure is relatively thick and resilient, non-spot welding processes (e.g., shot welding, seam welding, SMAW, MMA, GTAW, etc.) may be used. In another example, and especially where thermoplastic materials are employed, thermal or ultrasonic welding may be used. Still further suitable manners of coupling the tab portion and/or bulb portion include use of adhesives, bolting, and screwing, and even releasable coupling (e.g., via loops, hooks, etc.). FIG. 3 is an exemplary illustration where one portion of a bulb seal is welded to the one end surface of an insulation blanket and where another portion of the bulb seal is angled to provide a further surface that engages with another insulation blanket. In this example, the pliable seals 301 are disposed within the gap formed between the end surfaces of insulating structures 350 and allow for thermal expansion and shrinkage. Thus, it should be especially recognized that thermal seal structures contemplated herein can be simply, inexpensively, and effectively formed such that the seal allows fast attachment to another thermal insulation blanket in a simple and reliable manner. For example, where the attachment strip is made from metal, the seal can be welded to another thermal insulation blanket that has a metal coating.

Therefore, it should be appreciated that method of reducing thermal leakage through a gap defined by a first end surface of a first insulating structure and a second end surface of a second insulating structure can be achieved by permanently coupling a bulb seal having a tab portion and a bulb portion to the first end surface such that a first part of the tab portion and part of the bulb portion sealingly abut with the first end surface, and by permanently coupling the second insulating structure to the first insulating structure such that first and second end surfaces oppose each other and such that the bulb portion is disposed in the gap and sealingly contacts the second end surface. Consequently, a thermal insulation device (e.g., fire barrier, or insulating layer) will typically include a first insulating structure having a first end surface, and a second insulating structure having a second end surface, wherein the first and second insulating structures are positioned relative to each other such that a gap is defined by the first and second end surfaces. Preferred devices also include a bulb seal having a tab portion and a bulb portion, wherein the bulb seal is permanently coupled to the first end surface such that a first part of the tab portion and part of the bulb portion sealingly abut with the first end surface, and wherein the second insulating structure is permanently coupled to the first insulating structure such that the bulb portion is disposed in the gap and sealingly contacts the second end surface. Thus, preferred bulb seals will typically include a tab portion and a bulb portion, wherein a first part of the tab portion and the bulb portion are configured to allow formation of a sealing engagement with a first end surface of a first insulating structure by a welding process, and wherein the tab portion optionally comprises a second part that is angled to the first part.

It should be appreciated, however, that numerous alternative configurations and methods of attachment of the seal to the thermal insulating structure will be possible without departing from the inventive concept presented herein. For example, while it is typically preferred that the bulb has a generally round cross section, various other configurations are also deemed suitable and the particular configuration will typically depend on the particular use. For example, contemplated bulb shapes include angled, patterned, or irregular shapes in which the thickness is preferably the same along the length of the bulb structure. However, the bulb thickness may also change, especially where the insulating structure has a changing thickness, or where the bulb is configured to bend.

It is generally preferred that the bulb seals according to the inventive subject matter are manufactured (and packaged) as a continuous structure that can be cut to suitable sizes. Alternatively, the continuous structure may also include perforations at predetermined lengths to simplify sizing. In still further contemplated aspects, the bulb seal may be provided in fixed lengths and may additionally include an attachment portion that can be used to connect two bulb seal portions together.

Thus, specific embodiments and applications of thermal seals and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of forming a thermal insulation structure, comprising:
   providing a thermal insulating structure having an upper surface and a lower surface, and an end surface connecting the upper and lower surfaces, and wherein the end surface is a flat surface;
   welding a bulb seal strip to the end surface to thereby permanently couple the bulb seal strip to the end surface;
   wherein the bulb seal strip is formed from a tab portion extending from a bulb portion, wherein the tab portion and the bulb portion comprise a thermally resistant material, and wherein the bulb portion is filled with an insulating material;
   wherein the bulb seal strip is distinct from the thermal insulating structure, wherein the tab portion comprises a metal and is configured as a strip along one side of which the tab portion is coupled to the bulb portion, and wherein the bulb portion comprises an insulating material;
   wherein bulb seal strip is electrically welded to the end surface via a first part of the tab portion such that at least part of the bulb portion sealingly abuts with the end surface; and
   wherein a second part of the tab portion extends away from the end surface.

2. The method of claim 1 wherein the thermal insulating structure is a manually deformable thermal insulation blanket, a half-pipe shaped thermal insulation structure, a flat preformed insulation structure, or a curved preformed insulation structure.

3. The method of claim 1 wherein at least one of the tab portion and the bulb portion is formed from a metal.

4. The method of claim 1 wherein the tab portion and the bulb portion are coupled to each other via stitching or welding.

5. The method of claim 1 wherein the second part of the tab portion is angled relative to the first part of the tab portion.

6. The method of claim 5 wherein the second part of the tab portion is angled at a right angle relative to the first part of the tab portion.

7. The method of claim 1 wherein the second part of the tab portion is angled such that the second part of the tab portion is substantially parallel with a non-end surface of another second thermal insulating structure when the thermal insulating structure and the second thermal insulating structure are coupled to each other.

8. The method of claim 7 wherein the second part of the tab portion forms a shield against thermal leakage through a gap that is defined by respective end surfaces of the thermal insulating structure and the second thermal insulating structure.

9. The method of claim 7 wherein the tab portion is welded to the second thermal insulating structure.

10. The method of claim 1 wherein the step of electrically welding comprises spot welding or seam welding.

11. The method of claim 1 wherein the tab and bulb portions are fabricated from at least one of a metal, a metal alloy, a fiberglass cloth, a vitreous product, and a silicone containing polymer, and wherein the bulb portion is filled with at least one of fiberglass, mineral wool, and a ceramic material.

12. A thermal insulation device, comprising:
    a thermal insulating structure having an upper surface and a lower surface, and an end surface connecting the upper and lower surfaces, and wherein the end surface is a flat surface;
    a bulb seal strip welded to the end surface of the thermal insulating structure to thereby permanently couple the bulb seal strip to the end surface;
    wherein the bulb seal strip is formed from a tab portion extending from a bulb portion, wherein the tab portion and the bulb portion comprise a thermally resistant material, and wherein the bulb portion is filled with an insulating material;
    wherein the bulb seal strip is distinct from the thermal insulating structure, wherein the tab portion comprises a metal and is configured as a strip along one side of which the tab portion is coupled to the bulb portion, and wherein the bulb portion comprises an insulating material;
    wherein bulb seal strip is welded to the end surface via a first part of the tab portion such that at least part of the bulb portion sealingly abuts with the end surface; and
    wherein a second part of the tab portion extends away from the end surface.

13. The insulation device of claim 12 wherein the thermal insulating structure is a manually deformable thermal insulation blanket, a half-pipe shaped thermal insulation structure, a flat preformed insulation structure, or a curved preformed insulation structure.

14. The insulation device of claim 12 wherein the second part of the tab portion is angled such that the second part of the tab portion is substantially parallel with a non-end surface of another second thermal insulating structure when the thermal insulating structure and the second thermal insulating structure are coupled to each other.

15. The insulation device of claim 12 wherein the second part of the tab portion is configured to form a shield against thermal leakage through a gap that is defined by respective end surfaces of the thermal insulating structure and the second thermal insulating structure.

* * * * *